United States Patent [19]

Schweitzer, III

[11] Patent Number: 5,140,492

[45] Date of Patent: Aug. 18, 1992

[54] DISTANCE RELAY USING A POLARIZING VOLTAGE

[75] Inventor: Edmund O. Schweitzer, III, Pullman, Wash.

[73] Assignee: Schweitzer Engineering Laboratories, Inc., Pullman, Wash.

[21] Appl. No.: 508,048

[22] Filed: Apr. 11, 1990

[51] Int. Cl.$^5$ .............................................. H02H 3/26
[52] U.S. Cl. ........................................ 361/80; 361/65; 361/79
[58] Field of Search ................. 361/62, 65, 79, 80–85, 361/78, 88

[56] References Cited

U.S. PATENT DOCUMENTS

| | | | |
|---|---|---|---|
| 3,986,115 | 10/1976 | Huang | 324/102 |
| 4,342,064 | 7/1982 | Wilkinson | 361/80 |
| 4,686,601 | 8/1987 | Alexander | 361/80 |
| 4,709,295 | 11/1987 | Yamaura | 361/80 |
| 4,821,137 | 4/1989 | Wilkinson | 361/80 |

*Primary Examiner*—Steven L. Stephan
*Assistant Examiner*—Adolf Berhane
*Attorney, Agent, or Firm*—Jensen & Puntigam

[57] ABSTRACT

A distance relay for protection of power transmission lines, having a plurality of mho elements, each with a predetermined mho impedance characteristic. The relay has the capability of calculating a polarized reference voltage which remains constant through fluctuations in measured transmission line voltage. The difference voltage between the measured line voltage and the product of the measured line current and the mho element characteristic impedance is then compared against the polarized reference voltage in a product-type phase comparator to determine under-impedance conditions. If an under-impedance condition is present, the mho element produces a set output and a calculated "torque" value. The set outputs, if any, are then compared against a look-up table for fault type determination. If more than one set output is present, the magnitudes of the respective torque values are compared for fault type determination.

21 Claims, 6 Drawing Sheets

FIG. 8

| | CA | BC | AB | C | B | A | ACTION (FOR ZONES 1&2) |
|---|---|---|---|---|---|---|---|
| | Mho ELEMENTS PICKED UP (ZONE 3) | | | | | | |
| 1 | 0 | 0 | 0 | 0 | 0 | 0 | NO ACTION |
| 2 | 0 | 0 | 0 | 0 | 0 | 1 | RUN 'A' ELEMENT |
| 3 | 0 | 0 | 0 | 0 | 1 | 0 | RUN 'B' ELEMENT |
| 4 | 0 | 0 | 0 | 0 | 1 | 1 | RUN 'B' ELEMENT |
| 5 | 0 | 0 | 0 | 1 | 0 | 0 | RUN 'C' ELEMENT |
| 6 | 0 | 0 | 0 | 1 | 0 | 1 | RUN 'A' ELEMENT |
| 7 | 0 | 0 | 0 | 1 | 1 | 0 | RUN 'C' ELEMENT |
| 8 | 0 | 0 | 0 | 1 | 1 | 1 | RUN C ELEMENT |
| 9 | 0 | 0 | 1 | 0 | 0 | 0 | RUN MAX ØØ ELEMENT |
| 10 | 0 | 0 | 1 | 0 | 0 | 1 | RUN MAX ØØ/Øg ELEMENT |
| 11 | 0 | 0 | 1 | 0 | 1 | 0 | RUN MAX ØØ/Øg ELEMENT |
| 12 | 0 | 0 | 1 | 0 | 1 | 1 | RUN MAX ØØ ELEMENT |
| 13 | 0 | 0 | 1 | 1 | 0 | 0 | RUN MAX ØØ ELEMENT |
| 14 | 0 | 0 | 1 | 1 | 0 | 1 | RUN 'A' ELEMENT |
| 15 | 0 | 0 | 1 | 1 | 1 | 0 | RUN MAX ØØ ELEMENT |
| 16 | 0 | 0 | 1 | 1 | 1 | 1 | RUN MAX ØØ ELEMENT |
| 17 | 0 | 1 | 0 | 0 | 0 | 0 | RUN MAX ØØ ELEMENT |
| 18 | 0 | 1 | 0 | 0 | 0 | 1 | RUN MAX ØØ ELEMENT |
| 19 | 0 | 1 | 0 | 0 | 1 | 0 | RUN MAX ØØ/Øg ELEMENT |
| 20 | 0 | 1 | 0 | 0 | 1 | 1 | RUN 'B' ELEMENT |
| 21 | 0 | 1 | 0 | 1 | 0 | 0 | RUN MAX ØØ/Øg ELEMENT |
| 22 | 0 | 1 | 0 | 1 | 0 | 1 | RUN MAX ØØ ELEMENT |
| 23 | 0 | 1 | 0 | 1 | 1 | 0 | RUN MAX ØØ ELEMENT |
| 24 | 0 | 1 | 0 | 1 | 1 | 1 | RUN MAX ØØ ELEMENT |
| 25 | 0 | 1 | 1 | 0 | 0 | 0 | RUN MAX ØØ ELEMENT |
| 26 | 0 | 1 | 1 | 0 | 0 | 1 | RUN MAX ØØ ELEMENT |
| 27 | 0 | 1 | 1 | 0 | 1 | 0 | RUN MAX ØØ/Øg ELEMENT |
| 28 | 0 | 1 | 1 | 0 | 1 | 1 | RUN MAX ØØ ELEMENT |
| 29 | 0 | 1 | 1 | 1 | 0 | 0 | RUN MAX ØØ ELEMENT |
| 30 | 0 | 1 | 1 | 1 | 0 | 1 | RUN MAX ØØ ELEMENT |
| 31 | 0 | 1 | 1 | 1 | 1 | 0 | RUN MAX ØØ ELEMENT |
| 32 | 0 | 1 | 1 | 1 | 1 | 1 | RUN MAX ØØ ELEMENT |
| 33 | 1 | 0 | 0 | 0 | 0 | 0 | RUN MAX ØØ ELEMENT |
| 34 | 1 | 0 | 0 | 0 | 0 | 1 | RUN MAX ØØ/Øg ELEMENT |
| 35 | 1 | 0 | 0 | 0 | 1 | 0 | RUN MAX ØØ ELEMENT |
| 36 | 1 | 0 | 0 | 0 | 1 | 1 | RUN MAX ØØ ELEMENT |
| 37 | 1 | 0 | 0 | 1 | 0 | 0 | RUN MAX ØØ/Øg ELEMENT |
| 38 | 1 | 0 | 0 | 1 | 0 | 1 | RUN MAX ØØ ELEMENT |
| 39 | 1 | 0 | 0 | 1 | 1 | 0 | RUN 'C' ELEMENT |
| 40 | 1 | 0 | 0 | 1 | 1 | 1 | RUN MAX ØØ ELEMENT |

FIG. 8 CONT.

| | Mho ELEMENTS PICKED UP (ZONE 3) | | | | | | ACTION (FOR ZONES 1 & 2) |
|---|---|---|---|---|---|---|---|
| | CA | BC | AB | C | B | A | |
| 41 | 1 | 0 | 1 | 0 | 0 | 0 | RUN MAX ØØ ELEMENT |
| 42 | 1 | 0 | 1 | 0 | 0 | 1 | RUN MAX ØØ/Øg ELEMENT |
| 43 | 1 | 0 | 1 | 0 | 1 | 0 | RUN MAX ØØ ELEMENT |
| 44 | 1 | 0 | 1 | 0 | 1 | 1 | RUN MAX ØØ ELEMENT |
| 45 | 1 | 0 | 1 | 1 | 0 | 0 | RUN MAX ØØ ELEMENT |
| 46 | 1 | 0 | 1 | 1 | 0 | 1 | RUN MAX ØØ ELEMENT |
| 47 | 1 | 0 | 1 | 1 | 1 | 0 | RUN MAX ØØ ELEMENT |
| 48 | 1 | 0 | 1 | 1 | 1 | 1 | RUN MAX ØØ ELEMENT |
| 49 | 1 | 1 | 0 | 0 | 0 | 0 | RUN MAX ØØ ELEMENT |
| 50 | 1 | 1 | 0 | 0 | 0 | 1 | RUN MAX ØØ ELEMENT |
| 51 | 1 | 1 | 0 | 0 | 1 | 0 | RUN MAX ØØ ELEMENT |
| 52 | 1 | 1 | 0 | 0 | 1 | 1 | RUN MAX ØØ ELEMENT |
| 53 | 1 | 1 | 0 | 1 | 0 | 0 | RUN MAX ØØ/Øg ELEMENT |
| 54 | 1 | 1 | 0 | 1 | 0 | 1 | RUN MAX ØØ ELEMENT |
| 55 | 1 | 1 | 0 | 1 | 1 | 0 | RUN MAX ØØ ELEMENT |
| 56 | 1 | 1 | 0 | 1 | 1 | 1 | RUN MAX ØØ ELEMENT |
| 57 | 1 | 1 | 1 | 0 | 0 | 0 | RUN MAX ØØ ELEMENT |
| 58 | 1 | 1 | 1 | 0 | 0 | 1 | RUN MAX ØØ ELEMENT |
| 59 | 1 | 1 | 1 | 0 | 1 | 0 | RUN MAX ØØ ELEMENT |
| 60 | 1 | 1 | 1 | 0 | 1 | 1 | RUN MAX ØØ ELEMENT |
| 61 | 1 | 1 | 1 | 1 | 0 | 0 | RUN MAX ØØ ELEMENT |
| 62 | 1 | 1 | 1 | 1 | 0 | 1 | RUN MAX ØØ ELEMENT |
| 63 | 1 | 1 | 1 | 1 | 1 | 0 | RUN MAX ØØ ELEMENT |
| 64 | 1 | 1 | 1 | 1 | 1 | 1 | RUN MAX ØØ ELEMENT |

DISTANCE RELAY USING A POLARIZING VOLTAGE

TECHNICAL FIELD

This invention relates generally to relay apparatus for the protection of power transmission lines and more particularly concerns such a relay apparatus for determining faults in a transmission line based on the detection of under-impedance (less than normal) conditions along the line.

BACKGROUND OF THE INVENTION

Among a wide variety of protective relay devices used with power transmission lines, distance relays respond to faults which cause a less than normal impedance condition on the line, referred to as an under-impedance condition. A distance relay capable of accomplishing such protection includes one or more mho elements, each mho element having a circular impedance plane characteristic, such as shown in FIG. 1. FIG. 1 shows resistance R along one axis and reactance Z along the other axis. $Z_R$ at angle $\theta$ is the impedance setting of the particular mho element and defines the boundary or "reach" of the circular impedance plane characteristic shown in FIG. 1.

In FIG. 2, which is in the voltage plane, a voltage $Z_R \cdot I$, which is the product of the measured value of current on the transmission line at the relay and the relay impedance $Z_R$, is shown, as is the measured value of voltage V on the transmission line at the relay. I and V are the instantaneous values of current and voltage on the transmission line at the relay, taken at the same time. The difference voltage dV between the measured voltage V and the calculated voltage $Z_R \cdot I$ is also shown in FIG. 2. The three specific phasor quantities V, $Z_R \cdot I$ and dV form a triangle, as shown. Angle "a", which is the angle between the voltage phasors V and dV at point P on the mho circle is 90°. A distance relay is designed to discriminate between transmission line impedances which are larger or smaller than its characteristic impedance $Z_R$, on the basis that a smaller impedance will result in a mho circle of smaller diameter, which results in an angle greater than 90° between the V and dV phasors, while a larger impedance will cause the angle between the V and dV phasors to be less than 90°. As shown in FIG. 3, this discrimination is accomplished by a 90° phase comparator 10, which compares the measured instantaneous voltage V from the transmission line on input line 12 with the calculated value dV on input line 14. The output of the phase comparator 10 on line 16 provides an indication of whether the impedance condition of the transmission line is normal or less than normal, which is indicative of a possible transmission line fault. A great enough under-impedance condition will result in the relay producing a control signal to trip a circuit breaker for the particular transmission line in question, thus protecting the line.

Different types of phase comparators have been used in the manner described above. These include induction cylinder units, Hall Effect devices, and thermal and solid state networks. More recently, a system involving coincidence timing of sinusoidal inputs, involving the phase relationship between the input signals, has been used. Also, computers have been used to provide calculated simulations of mechanical and electro-mechanical devices. For instance, for an induction cylinder type of phase comparator, the difference between the input signals produces a mechanical torque which increases in magnitude in accordance with such difference, resulting in a contact closing when a predetermined under-impedance condition exists on the transmission line. In a computer, the mechanical action of the cylinder unit can be simulated through the multiplication of dV and a polarizing voltage. The resulting product can still be referred to conveniently as a "torque." The sign of the product indicates an under or over-impedance, i.e. whether the impedance is inside or outside the mho circle characteristic. The actual magnitudes of the torque values, however, were heretofore not considered to be useful.

In the protection of a typical transmission line which carries three phase AC power, a distance relay includes a plurality of individual mho elements, each having a specified impedance characteristic, to cover the various distance line fault possibilities. For instance, with three power phases A, B and C, a total of six mho elements will cover three phase-to-ground faults, i.e. A-G, B-G and C-G, as well as three phase-to-phase faults, i.e. A-B, B-C and C-A.

Although the above-described systems for determining distance faults, including those utilizing computer calculations instead of electrical-mechanical devices, provide to a significant extent accurate fault information, there are a number of fault situations which may not be accurately detected by the abovedescribed systems. For instance, when there is a fault close to the relay itself, the measured voltage V may approach zero, leading to inaccuracies in the resulting calculations. This is true in particular when the mho elements are self-polarized, i.e. the same voltage which is used as a component in determining the difference voltage dV is also used as the polarizing, i.e reference, voltage V for phase comparison.

To overcome this problem, polarizing voltages can be used which are based on memory, or which are based on a phase or phases free from faults FIG. 4 shows a mho element voltage plane characteristic using a polarizing voltage VP. The polarizing voltage increases the accuracy and fault-determining capacity of distance relays. However, such relays are still characterized by other significant problems. One problem concerns the response of more than one mho element to a particular fault, with resulting confusion as to the fault type. Providing reliable fault-type identification in single-pole tripping systems, for targeting and other applications, is also a significant issue in many systems. Attempting to satisfy all of the criteria leads to compromises in relay sensitivity, as well as increased cost when additional external logic must be utilized.

The present invention uses a particular form of polarizing voltage and a system for analyzing the calculated torque measurements from each mho element to provide a significant improvement in reliable fault information, including fault-type determination.

DISCLOSURE OF THE INVENTION

Accordingly, the present invention is a relay apparatus for protection of power transmission lines. The relay apparatus includes at least one relay element, such as a mho element, having a selected impedance characteristic. The voltage and current values on a given section of transmission line are measured and used to produce a polarized reference voltage. The difference voltage between the measured value of line voltage and the product of the measured value of line current and the impedance characteristic of the relay element is then determined. The difference voltage and the polarized reference voltage are then compared to produce an output which includes both a signal indication of a possible fault on the transmission line and a magnitude value associated therewith.

BRIEF DESCRIPTION OF THE DRAWINGS

FIG. 8 is a look-up table used with the fault identification system of FIG. 7.

BEST MODE FOR CARRYING OUT THE INVENTION

Figure 5:
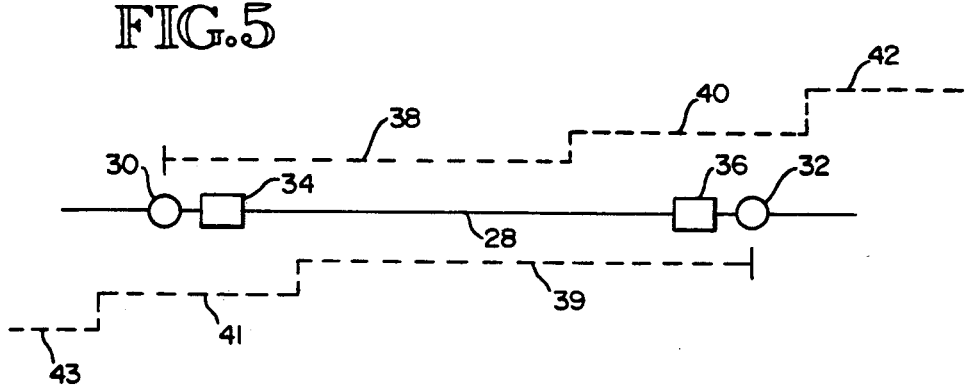
FIG. 5 is a diagram of a generalized protection approach for a section of transmission line.

In a power distribution system involving a plurality of individual transmission lines, there will typically be protective equipment, in the form of a plurality of protective relays, at both ends of each section of transmission line. This is shown in FIG. 5, which includes one section of transmission line 28 between two distribution points, i.e. substations, 30 and 32. The protective equipment shown generally at 34 in the vicinity of distribution point 30 looks forward along the line 28 toward distribution point 32 and beyond, while protective equipment 36 in the vicinity of distribution point 32 will look back along the line 28 toward distribution point 30 and beyond. Typically, there will be protective equipment or elements, along with associated timers, designed to cover three zones, i.e. zone 38 (the first zone), zone 40 (the second zone) and zone 42 (the third zone) for forward-looking equipment 34, to provide in-depth and reliable coverage for the section of transmission line 28 between substation points 30 and 32. There are also three zones of coverage 39, 41 and 43 looking back along the line 28 from protective equipment 36. This multiple zone approach has a number of advantages, including the ability to avoid tripping the breaker for line 28 when the fault exists on a section of the transmission line downstream from point 32 or upstream from point 30.

Figure 1:
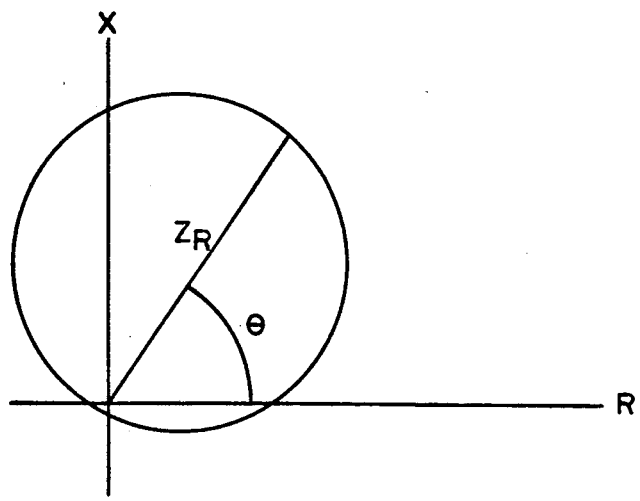
FIG. 1 is a diagram of a self-polarized mho element characteristic, in the impedance plane.
Figure 2:
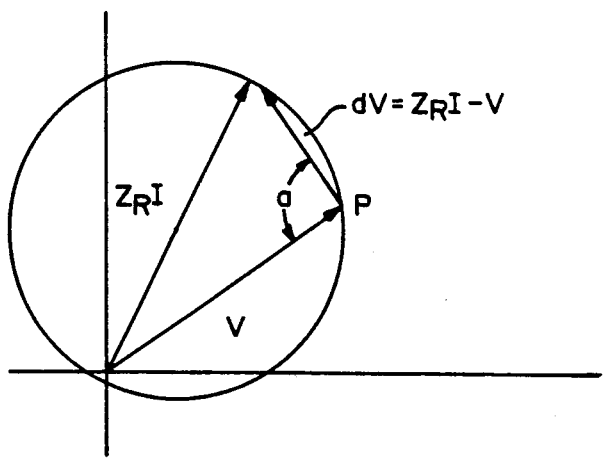
FIG. 2 is a diagram in the voltage plane of the self-polarized mho element of FIG. 1.
Figure 3:
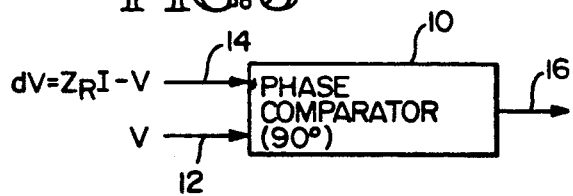
FIG. 3 is a diagram showing the phase comparison circuit for the mho element of FIG. 1.
Figure 4:
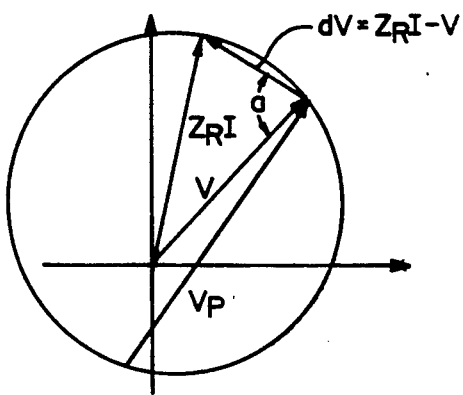
FIG. 4 is a voltage plane diagram of a mho element characteristic using a polarizing voltage.

The array of protective equipment, i.e. 34, includes, among others, elements known as distance relays, discussed above in some detail, which look for under-impedance conditions on the line. In a three phase system, a distance relay at 34 will include six mho elements, each with its own specific impedance characteristic, such as shown in FIG. 1. A separate mho element covers each of the following fault types on a typical three-phase transmission line: the A phase line-to-ground, the B phase line-to-ground, the C phase line-to-ground, the A phase line to the B phase line, the B phase line to the C phase line, and the C phase line to the A phase line. Three phase faults and double line-to-ground faults also are covered by one or more of the above-described elements.

In the present invention, a positive sequence memory voltage is used to develop the polarizing voltage for the mho element, from no-fault voltage measurements of VA, VB and VC. Positive sequence voltage is well-known in the art and refers to the combined phasor line voltages VA, VB and VC, rotating in a positive sequence. The resulting polarizing voltage, referred to as VP, is a memory voltage, because it is calculated from no-fault values of VA, VB and VC and remains constant and thus will not vary when there is a line fault which would otherwise produce a change in one of the phasor voltages.

Figure 6:
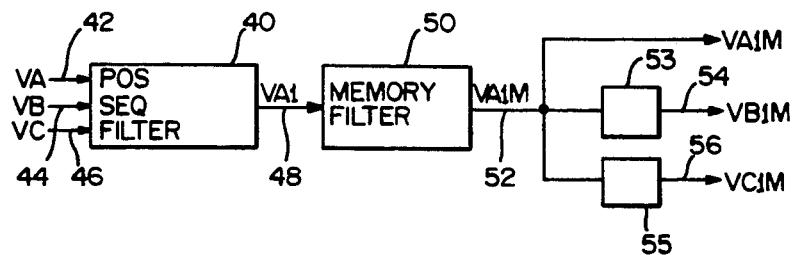
FIG. 6 is a block diagram showing the development of the polarizing voltage used in the present invention.

FIG. 6 shows the circuit in the distance relay for calculating the polarizing voltage. The three phase voltages VA, VB and VC are applied on lines 42, 44 and 46 to circuitry 40 which samples the signals at established intervals, and filters the sampled signals through a positive sequence filter to produce VA1 in accordance with the following equation: $VA1 = \frac{1}{3}[VA + (a-1)VB + (a^2-1)VC]$, where "a" has a magnitude of one and an angle of 120°. The result of this is that the VB and the VC voltages are shifted by ±60° and inverted, which provides a good transient response. The output of the positive sequence filter, referred to a VA1, appears on line 48.

The next step in obtaining the polarization voltage VP is to apply VA1 on line 48 to a memory filter 50 which operates according to the following equation: $VA1M = 1/16 \, (VA1_k) - 15/16 \, (VA1M_{k-2})$, where VA1M is the output on line 52 of the memory filter, and the index k is counted in one quarter cycle steps. The memory filter 50 in effect provides an output from a point earlier in time by one half cycle or 180°, inverts it and then scales it by a factor of 15/16. The inversion removes the 180° phase shift introduced by the half cycle delay. The filter then adds 1/16 of the most recent measurement of the positive sequence voltage. The filter output (VA1M) has a time constant of approximately four cycles and provides a polarization signal for a period covering twenty cycles. This time coverage provides good results, as documented in oscillogram tests.

The output of the memory filter, VA1M, on line 52, is used directly as a polarizing voltage VP for VA phase lines, and shifted in phase by ±60° and inverted by elements 53 and 55 to produce polarizing voltage VB1M on line 54 and VC1M on line 56. The VB1M and VC1M polarizing voltages are used by the VB and VC mho elements, respectively. The calculation of the polarizing voltage VP occurs four times per power cycle, i.e. every 90°, in the embodiment shown.

The voltage and current on the transmission line are applied to each mho element at a sampling rate of approximately four times per cycle in the embodiment shown. The values of dV are calculated and then a phase comparison is made between dV and VP for each mho element by forming the product dV·VP. If an underimpedance condition is determined, which is indicated by the sign of the product, an output signal is produced, referred to hereinafter for explanation purposes as a set output, and illustrated as a "one" in FIG. 8. The magnitude of the product is also significant, as discussed below, and referred to hereinafter as a torque magnitude. Thus, each mho element produces, at specified intervals, a set output (or not) based on the sign of the product dV·VP and a torque magnitude output.

Figure 7:
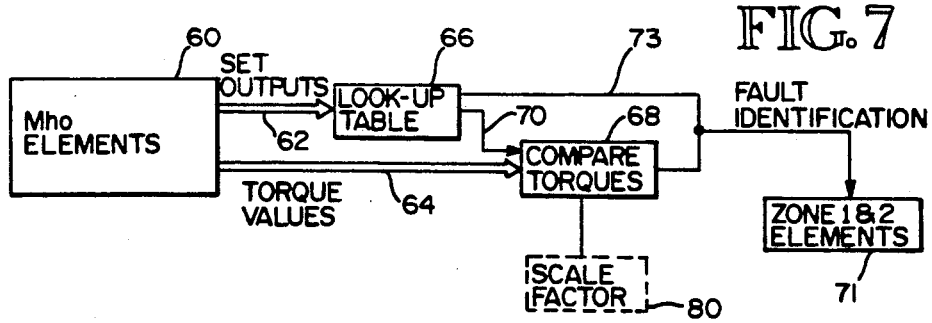
FIG. 7 is a general block diagram of the fault identification system of the present invention.

FIG. 7 is a block diagram showing the structure of the present invention which identifies particular line faults based on the set and torque magnitude outputs provided by the individual mho elements. Block 60 shows the six mho elements as a group, with each of the mho elements, as explained above, capable of producing a set output (or not) indicating an under-impedance condition determined by that mho element, as well as the magnitude of the "torque" for each mho element, i.e. the magnitude of the product dV·VP. Normally in the embodiment shown, the magnitude of any torque from a mho element indicating an under-impedance condition will be positive, but it would also be possible to utilize negative torques as well. The outputs of block 60 for the mho elements are shown collectively for both the set (binary one) outputs and the torque (magnitude) outputs, although it should be understood that in each case separate lines for each mho element are provided. The set-not set output information on line 62 is applied to a software look-up table processor 66 and processed relative to one or more of the individual mho elements having a set output.

One embodiment of such a table is shown in FIG. 8. On the left hand side of the table are listed the six mho elements covering zone three in the embodiment shown (see FIG. 5), with an indication of whether or not they produce a set-not set (one-zero) output. On the other side of the table is the action which is to result for the mho elements for zones 1 and 2. Table 8 lists virtually all of the possible set-not set combinations of the six mho elements in the relay. By way of example, in rows 2, 3 and 5, where only one mho element has a set output, then that element and that element alone is run for zones 1 and 2, shown as block 71, on the transmission line, to identify the fault. An appropriate output is provided from the look-up table processor 66 on line 73. The zone three protective equipment is on a timer and will not trip the breaker for the line unless the fault remains for the preestablished time. When only one mho element is run for zones 1 and 2, a substantial amount of processing time is saved. If the fault is within the particular line section, i.e. line 28, then the single elements for zones 1 and 2 will identify it and the breaker will be tripped.

The present invention, however, is capable of identifying which one particular mho element should be run in zones 1 and 2 when there are two or more mho elements having set outputs for zone 3. Typically, a comparison of the torque values is made by the comparator 68. For instance, in row 10, where the elements AB and A both have set outputs, there will be a comparison made in block 68 of the magnitudes of the respective torques for those mho elements, obtained on line 64. The set output indications will be obtained from the look-up table processor 66 on line 70. The maximum torque element typically will be the element that is run in zones 1 and 2. It is typical that torque comparisons are made for any condition in which two or more mho elements have set outputs, and where the fault type cannot be simply obtained from the look-up table (FIG. 8) for multiple mho element set outputs.

It has been found that this particular look-up table and the torque process described above provides reliable fault-identification information in identifying which mho elements to run in zones 1 and 2. This processing of zone 3 mho element information, using both set outputs and torque magnitudes, is very helpful, since it reduces the overall processing time of the protective system significantly, i.e. only one mho element need be run in zones 1 and 2 to provide substantially complete distance fault information concerning whether or not to trip the breaker for the line. A flow chart shown in FIG. 9 sets forth the particular sequence of steps in the analysis process leading to the determination of the particular action steps shown in FIG. 8.

In conclusion, the combination of set outputs and torque values are useful in fault-type discrimination for identification of a particular fault location, saving substantial processing time for zones 1 and 2 elements. A positive sequence memory voltage is used for the mho element polarization voltage. The present invention may be used for a broad range of power system configurations. Performance in a particular system configuration can be optimized, adjusting selectivity versus sensitivity as required. In one example, as the resistance of an AG (phase line A-to-ground) fault increase, the torque of the CG element can exceed the AG element torque. In three-pole systems, the maximum torque element can be used for maximum sensitivity, while with single-pole systems, the use of a look-up table which relates the AG-CG combined pickup to the actual AG fault provides satisfactory results. In another example, where the resistance of a close-in AG fault increases, the AB element torque might in some cases exceed the AG element torque. Again, the system sensitivity can be optimized for a three-pole trip system, while selectivity can be emphasized in a single-pole trip scheme, through the use of a look-up table.

In addition, the system of the present invention can provide accurate fault information for systems in which the source-to-line impedance is strong, in which systems it is well known that fault-type identification is typically more difficult.

Figure 9:
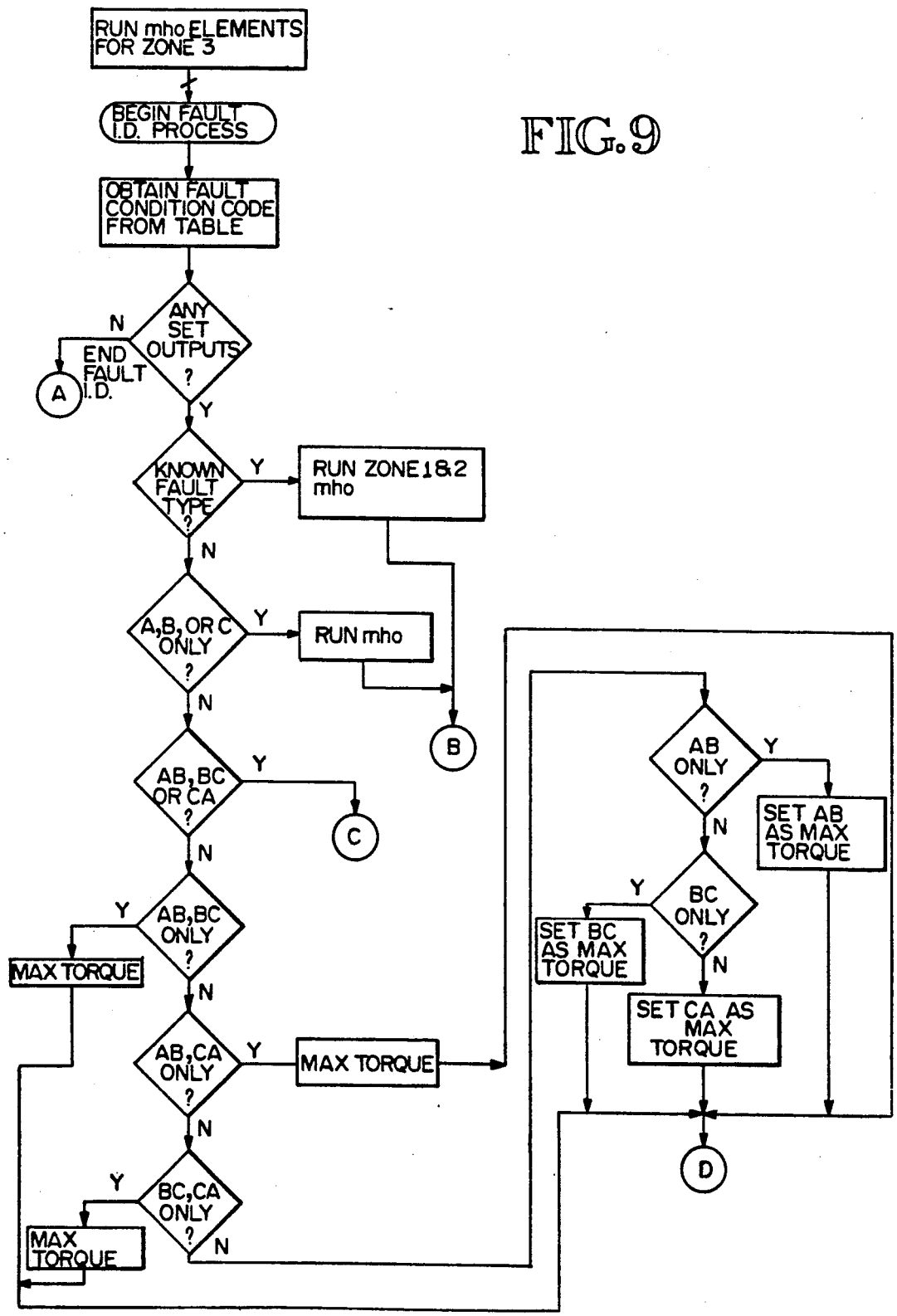
FIG. 9 is a flow chart showing the sequence of processing steps for the system of FIG. 7.
Figure 9:
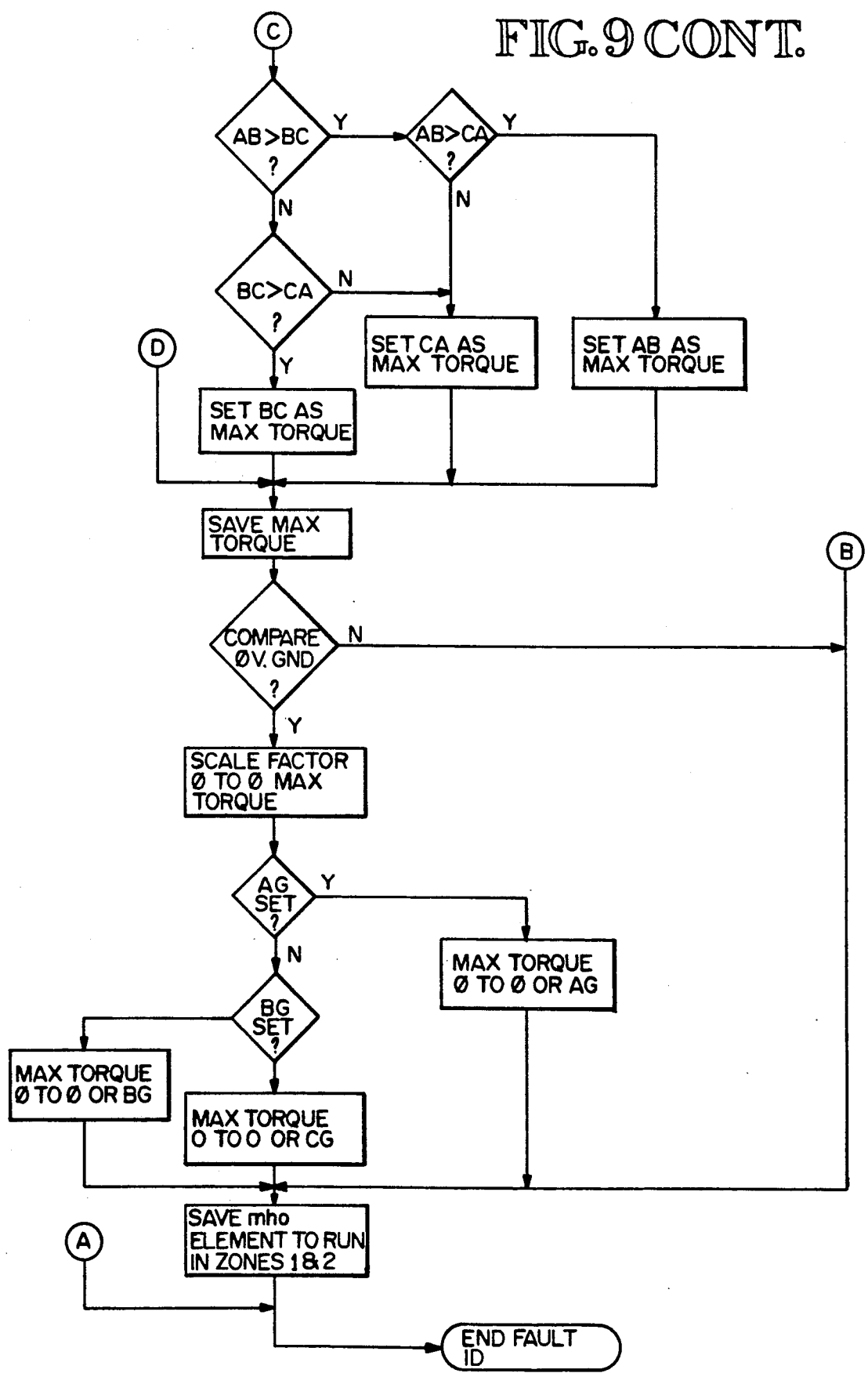

In a variation of the system of FIG. 5, one or more of the torque values from the mho elements, such as phase-to-phase mho elements, may be weighted by a scale factor from circuit 80 in order to make an adjustment for a particular system situation. For instance, certain torque inputs may be scaled depending upon the direction or the level of the current flow load through the line. A phase-to-phase weighting step is shown in FIG. 9. A typical scaling factor might be 1.25.

It has been found that the present invention also provides a capability of fault discrimination in many complex or difficult system fault situations, including close-in phase and ground faults, double line-to-ground faults and may also be used to prevent uninvolved mho elements from operating during single-pole open conditions. The individual mho elements in the relay of the present invention are typically very stable in operation during open-pole intervals due to the constant phase relationship maintained by the polarizing voltages for all elements and during all disturbances.

Although a preferred embodiment of the invention has been disclosed herein for illustration, it should be understood that various changes, modifications and substitutions may be incorporated in such embodiment without departing from the spirit of the invention as defined by the claims which follow. For instance, the present invention has been described using as an example the well-known mho relay element. However, other relay elements, such as offset mho and various combinations of directional elements could also be used.

What is claimed is:

1. A relay apparatus for protection of power transmission lines, comprising:
   at least one relay element having a selected impedance characteristic;
   means for measuring values of voltage and current for a selected transmission line;
   means using the measured voltage value to produce a polarized reference voltage;
   means determining a difference voltage between a measured voltage value and the product of the relay element impedance and a measured current value; and
   means comparing the difference voltage and the polarized reference voltage to produce an output which includes a signal indication of a possible fault on the transmission line and a magnitude associated therewith, wherein the magnitude provides further information concerning the possible fault.

2. An apparatus of claim 1, including means processing the output of said comparing means to determine a particular fault type and initiating action, if appropriate, of additional protective apparatus associated with the transmission line.

3. An apparatus of claim 2, wherein the additional protective equipment is a circuit breaker.

4. An apparatus of claim 2, wherein the relay apparatus includes a plurality of relay elements, each having an impedance characteristic, associated with selected zone portions of said transmission line, wherein said one relay element is associated with a zone portion most remote from the relay apparatus and wherein the additional protective apparatus is at least one relay element associated with a less remote zone portion of the line.

5. An apparatus of claim 4, wherein the relay elements are mho elements, and wherein the relay apparatus includes a first group of mho elements associated with said most remote zone portion and a second group of mho elements associated with the less remote zone portions.

6. An apparatus of claim 1, wherein the polarized reference value is determined from a positive sequence voltage.

7. An apparatus of claim 6, wherein the means for obtaining a polarized reference voltage includes means for sampling voltage and current values for the transmission line and calculating a positive sequence voltage VA1, for phase A, according to the following equation: $VA1 = \frac{1}{3}[VA+(a-1)VB+(a^2-1)VC]$, where a has a magnitude of one and an angle of 120 degrees.

8. An apparatus of claim 7 including means for filtering the positive sequence voltage VA1 and calculating the polarized reference voltage VA1M according to the following equation: $VA1M = 1/16(VA1_k) - 15/16(VA1M_{k-2})$, wherein k is incremented in one quarter cycle steps.

9. An apparatus of claim 5, wherein the selected transmission line includes three phase lines A, B and C, and wherein the first group of mho elements includes one mho element for phase line A-to-ground, one mho element for phase line B-to-ground, one mho element for phase line C-to-ground, one mho element for phase line A to phase line B, one mho element for phase line B to phase line C and one mho element for phase line C to phase line A, and wherein there is more than one zone of protection, said first group of mho elements covering the most remote zone of protection, and said second group of mho elements being associated with the remaining zones of protection.

10. An apparatus of claim 5, wherein the output of the comparing means includes an output from each mho element.

11. An apparatus of claim 10, wherein said processing means includes means for comparing the magnitude values for each mho element having a signal indication output and providing a control output to the additional protective apparatus which is indicative of the fault type.

12. A method for protection of power transmission lines using relay elements having selected impedance characteristics, comprising the steps of:
    measuring voltage and current values on the transmission line;
    calculating a polarized reference voltage using the measured voltage;
    determining a difference voltage between a measured voltage value and the product of the relay element impedance and a measured current value; and
    comparing the difference voltage and the polarized reference voltage to produce an output which includes a signal indication of a possible fault on the transmission line and a magnitude value associated therewith, wherein the magnitude value provides further information concerning the possible fault.

13. A method of claim 12, further including a step of processing said output to determine a particular fault type and thereafter a step of initiating action, if appropriate, of additional protective apparatus associated with the transmission line.

14. A method of claim 13, wherein the polarized reference voltage is calculated from a positive sequence voltage.

15. A method of claim 14, wherein the positive sequence voltage VA1 is calculated according to the following equation: $VA1 = \frac{1}{3}[VA+(a-1)VB+(a^2-1)VC]$, where a has a magnitude of one and angle of 110 degrees.

16. A method of claim 15, including the step of filtering the positive sequence voltage and calculating the polarized reference voltage VA1M according to the following equation: $VA1M = 1/16(VA1_k) - 15/16(VA1M_{k-2})$, wherein k is incremented in one quarter cycle steps.

17. A method of claim 13, wherein the relay elements are mho elements which are associated with selected zone portions of said transmission line, a first plurality of the mho elements being associated with the most remote zone portion and a second plurality of mho elements being associated with remaining less wherein the initiating step includes the step of initiating action of a selected one of said second plurality of mho elements.

18. A method of claim 17, wherein the processing step includes a step of recognizing signal indications from the mho elements and a step of analyzing said signal indications against a look-up table to determine any initiating action, and the further step of comparing the magnitude values from the mho elements having signal indications if more than one to determine the initiating action.

19. A method of claim 18, wherein the initiating action is dependent upon the greatest magnitude value associated with the signal indications when more than one signal indication is present.

20. An apparatus of claim 1, wherein said comparing means including means for multiplying the difference voltage and the polarized reference voltage, said output being the product thereof.

21. A method of claim 12, wherein the step of comparing includes a step of multiplying the difference voltage and the polarized reference voltage, said output being the product thereof.

* * * * *

UNITED STATES PATENT AND TRADEMARK OFFICE
CERTIFICATE OF CORRECTION

PATENT NO.   : 5,140,492
DATED        : August 18, 1992
INVENTOR(S)  : Edmund O. Schweitzer, III It is certified that error appears in the above-indentified patent and that said Letters Patent is hereby corrected as shown below:

In claim 17, at column 8, line 47, after the word "less," the following phrase should be inserted:

--remote zone portions and--.

In claim 18, at column 8, line 55, after the word "one," insert the following phrase:

--signal indication is present--.

Signed and Sealed this

Seventh Day of September, 1993

Attest:

BRUCE LEHMAN

Attesting Officer

Commissioner of Patents and Trademarks